United States Patent [19]

Wyatt et al.

[11] Patent Number: 4,492,389
[45] Date of Patent: Jan. 8, 1985

[54] HIGH-LIFT HYDRAULIC AXLE

[76] Inventors: Gordon F. Wyatt, Rte. 4, Box 122, Isanti, Minn. 55040; Willis G. Wyatt, 8505 Eldorado St., Blaine, Minn. 55434; Erle L. Wyatt, 14461 Highway 65, Anoka, Minn. 55303

[21] Appl. No.: 341,509

[22] Filed: Jan. 21, 1982

[51] Int. Cl.³ ............................................. B60G 11/26
[52] U.S. Cl. ................................. 280/704; 280/43.23
[58] Field of Search ................. 280/81 R, 704, 43.23, 280/43.13; 267/64.21, 64.19; 105/215 C

[56] References Cited

U.S. PATENT DOCUMENTS

| | | | |
|---|---|---|---|
| 3,199,890 | 8/1965 | Caldwell | 280/704 |
| 3,390,895 | 7/1968 | Verdi | 280/704 |
| 3,578,352 | 5/1971 | Heine | 280/43.23 |
| 3,689,102 | 9/1972 | Granning | 280/704 |
| 3,704,896 | 12/1972 | Buelow | 280/704 |
| 3,740,071 | 6/1973 | Bilas | 280/704 |
| 3,860,256 | 1/1975 | Jackson et al. | 280/81 R |
| 3,874,469 | 4/1975 | Sjovall | 180/12 |
| 4,102,424 | 7/1978 | Heinze | 280/43.23 |
| 4,165,884 | 8/1979 | Allison et al. | 280/43.23 |
| 4,195,856 | 4/1980 | Larson et al. | 280/704 |

FOREIGN PATENT DOCUMENTS 1195476 6/1970 United Kingdom ............ 280/43.23

Primary Examiner—Joseph F. Peters, Jr.
Assistant Examiner—Ross Weaver
Attorney, Agent, or Firm—Orrin M. Haugen; Thomas J. Nikolai; Douglas L. Tschida

[57] ABSTRACT

The combination of a suspension arm, a stub axle having an axis and projecting from the arm in a first direction, means pivotally mounting the arm for movement about a second axis parallel to the axis of the axle, and motor means for causing the movement of the arm between, and maintaining it in, first and second extreme positions.

4 Claims, 5 Drawing Figures

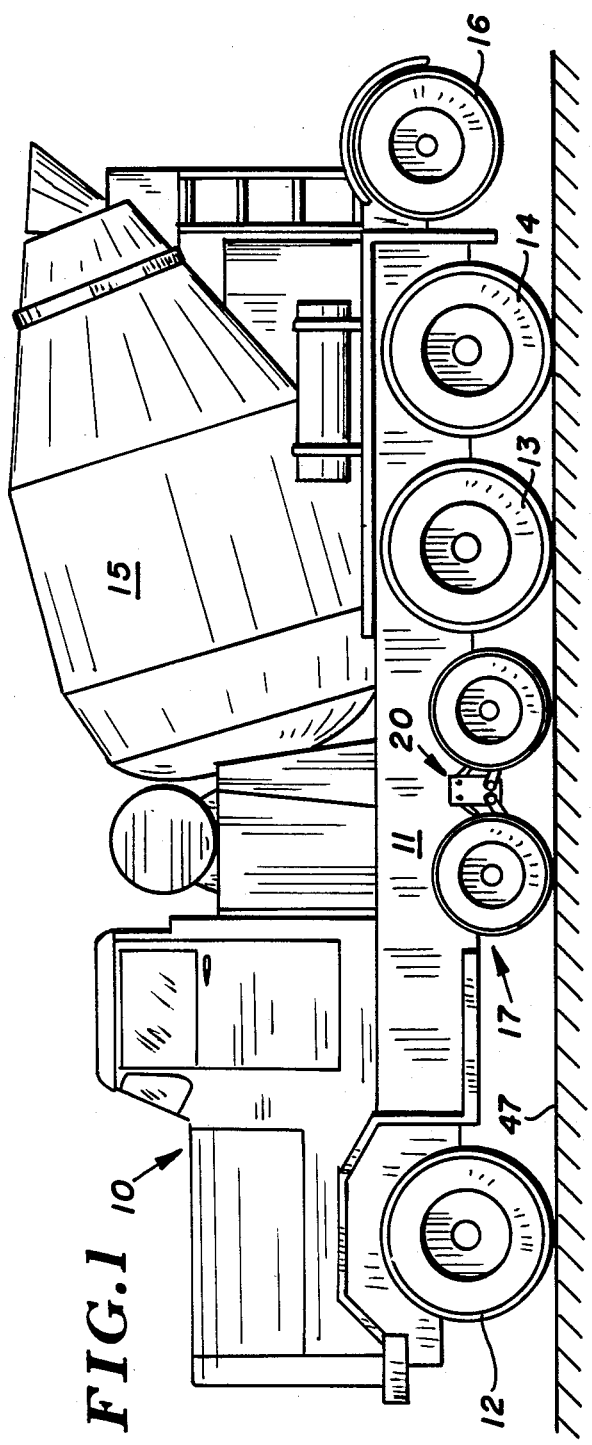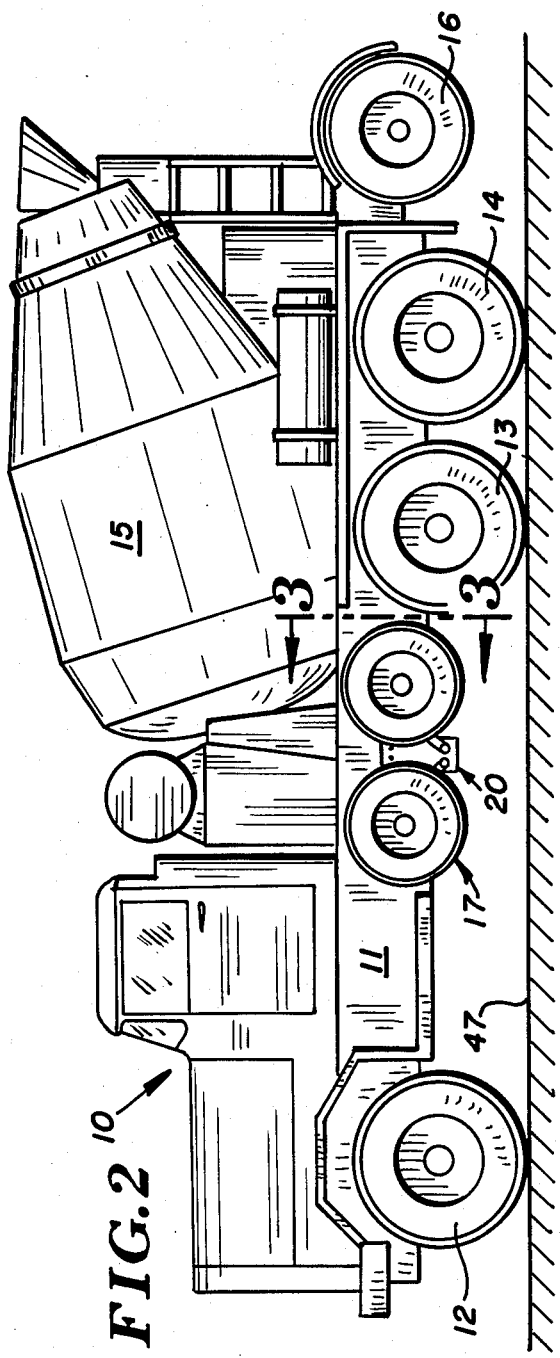

HIGH-LIFT HYDRAULIC AXLE

TECHNICAL FIELD

This invention relates to the field of transportation, and particularly to means for temporarily increasing the permissible payload of over-the-highway vehicles by increasing the number of axles having wheels contacting the highways, the means being retractable to prevent engagement with obstructions when transportation is continued under off-the-highway conditions.

BACKGROUND OF THE INVENTION

In the field of highway transportation exacting regulations have been laid down as regards to the maximal gross weight which can be carried by vehicles having different numbers of consecutive axles in contact with the highway and different spacings between the axles. These factors can be considered in the design of a vehicle for continuous highway use, and the gross weights allowable are always less than the vehicle itself is capable of carrying. The gross weight is, of course, the payload of the vehicle, and for the transportation operators it is desirable to load each vehicle as fully as its structure—number and spacing of axles—will allow.

A special form of transportation involves the transfer of ready-mix concrete. While it is desirable to haul as much concrete per load as is possible, problems arise when the vehicle reaches the desired site, and must leave the highway and traverse irregular or disturbed terrain. Existence of supernumerary axles, needed to meet highway load requirements, can then result in interference with movement of the vehicle to the exact site of delivery. As pointed out above, the larger number of axles is not needed for truck structure itself, and no load limit applies at the delivery site.

BRIEF SUMMARY OF THE INVENTION

The present invention comprises an arrangement whereby supernumerary axles can be made available for highway transport, to increase the vehicle payload, but can be retracted when desired, to avoid interference by surface irregularities, to a height which has heretofore been prevented by the presence of vehicle frame and drive shaft components to interfere with raising the axles of the auxiliary support wheel. This is accomplished by a structure in which the axles of auxiliary wheels do not extend transversely for the full width of the vehicle, but terminate outside the vehicle frame in the form of stub axles extending only outwardly, to support wheel assemblies: the stub axles are mounted on suspension arms pivotally carried by the frame and actuated downwardly, to give road contact, or upwardly, to give clearance.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals have been applied to like components throughout the several views, FIG. 1 is a side view of a vehicle with auxiliary load support means according to the invention in load carrying position;

FIG. 2 is a similar view of the vehicle with the auxiliary load support means in clearance position;

BRIEF DESCRIPTION OF THE PREFERRED EMBODIMENT

Figure 3:
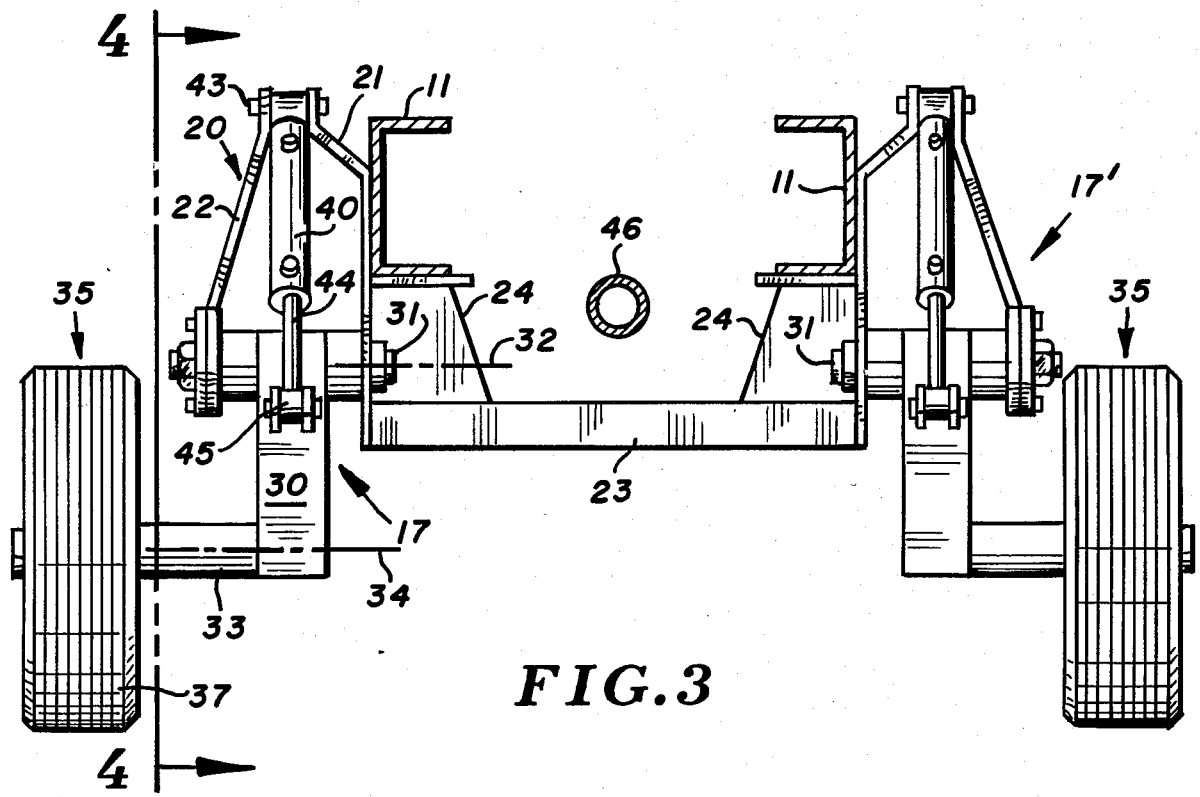
FIG. 3 is a fragmentary transverse section along the line 3—3 of FIG. 2.

FIG. 1 shows a vehicle 10, a truck for delivering ready-mix concrete, having a frame 11, front wheels 12, and rear wheels 13 and 14 for supporting the frame above the ground. The load is indicated at 15, and on auxiliary dolly 16 may be provided as is conventional for such vehicles.

A high-lift hydraulic axle arrangement according to the invention is shown at 17: in FIG. 1 it is in a first position, to provide additional support against a road surface, and in FIG. 2 it is in a second position, to provide additional ground clearance.

Arrangement 17 comprises a pair of individual units mounted on the frame of a vehicle at the left and at the right: Since the units are identical only one will be described in detail, referring to FIGS. 3-5.

A bracket 20 has a first portion 21 secured to frame 11, and a second portion 22 spaced laterally therefrom: a cross-member 23 may be provided to give reinforcement to bracket portions 22, and may include gussets 24.

A forwardly extending suspension arm 30 is pivoted at one end on a shaft 31 in members 21 and 22, about a horizontal axis 32 orthogonal to frame 11. At the other end, arm 30 carries a stub axle 33 having an axis 34 parallel to axis 32. A wheel assembly 35 including a wheel 36 and a tire 37 is rotatably mounted on axle 33, which extends only outwardly from arm 30. A linear hydraulic ram 40 having fluid connections 41 and 42 is pivoted to bracket 20, at a suitable fastener 43, about an axis parallel to axes 32 and 34: the hydraulic ram includes a piston shaft 44 which is pivoted to arm 30 at a clevis and pin 45. Ordinarily the axis of shaft 31 is below the frame 11 and the drive shaft 46 of the vehicle. Actuator 40 is preferably of the type which includes an accumulator, although equivalent structures may also be used.

Figure 4:
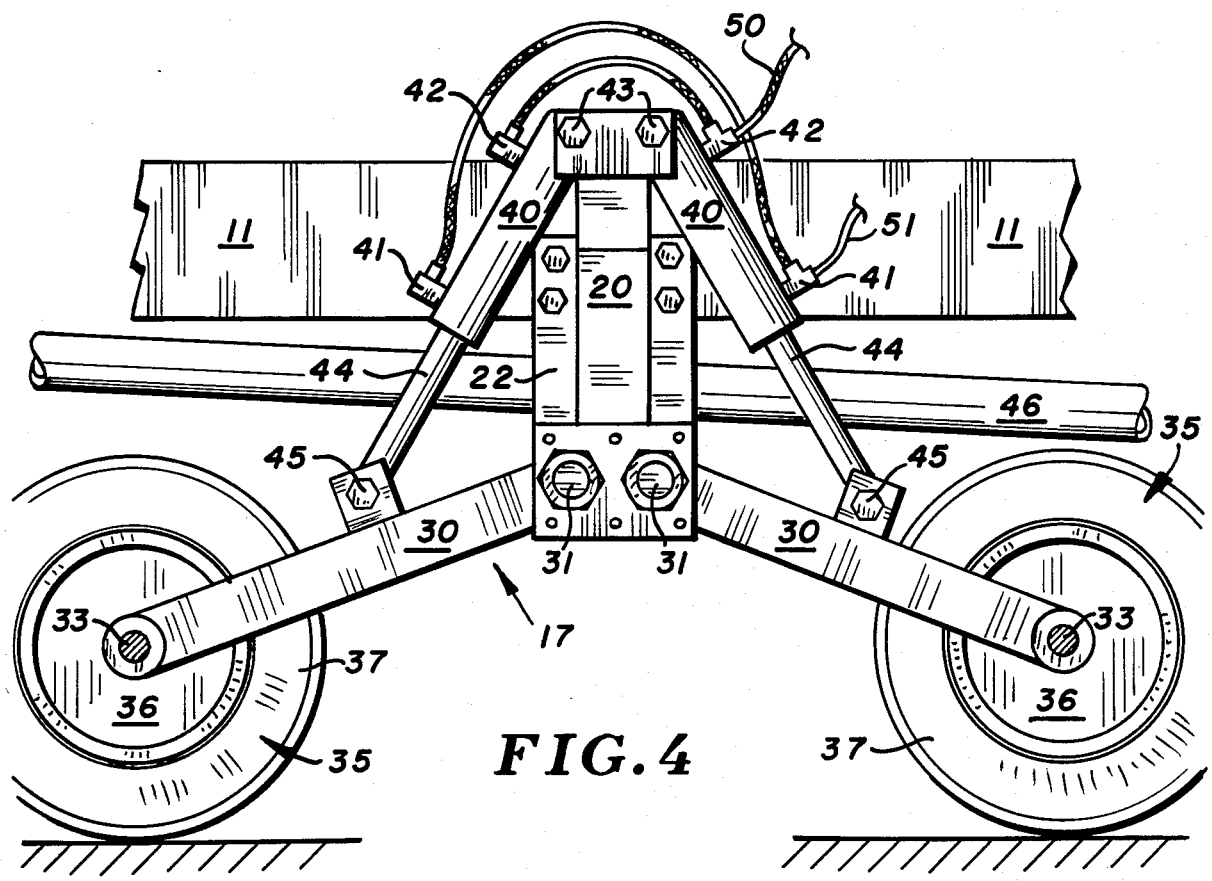
FIG. 4 is a fragmentary view generally along the 4—4 of FIG. 3, showing the invention in load carrying position.

It will be evident that when piston shaft 44 is extended from motor 40, arm 30 pivots in a counterclockwise direction about shaft 31 until wheel assembly 35 reaches a position to engage the road surface, suggested at 47: see FIG. 4. When piston shaft 44 is withdrawn into ram 40, arm 30 pivots in a clockwise direction about shaft 31 to raise wheel assembly 35 above the ground and give clearance over rough country: this movement continues until axis 34 of shaft 35 is above drive shaft 46 and above at least the lower portion of frame 11: See FIG. 5.

Figure 5:
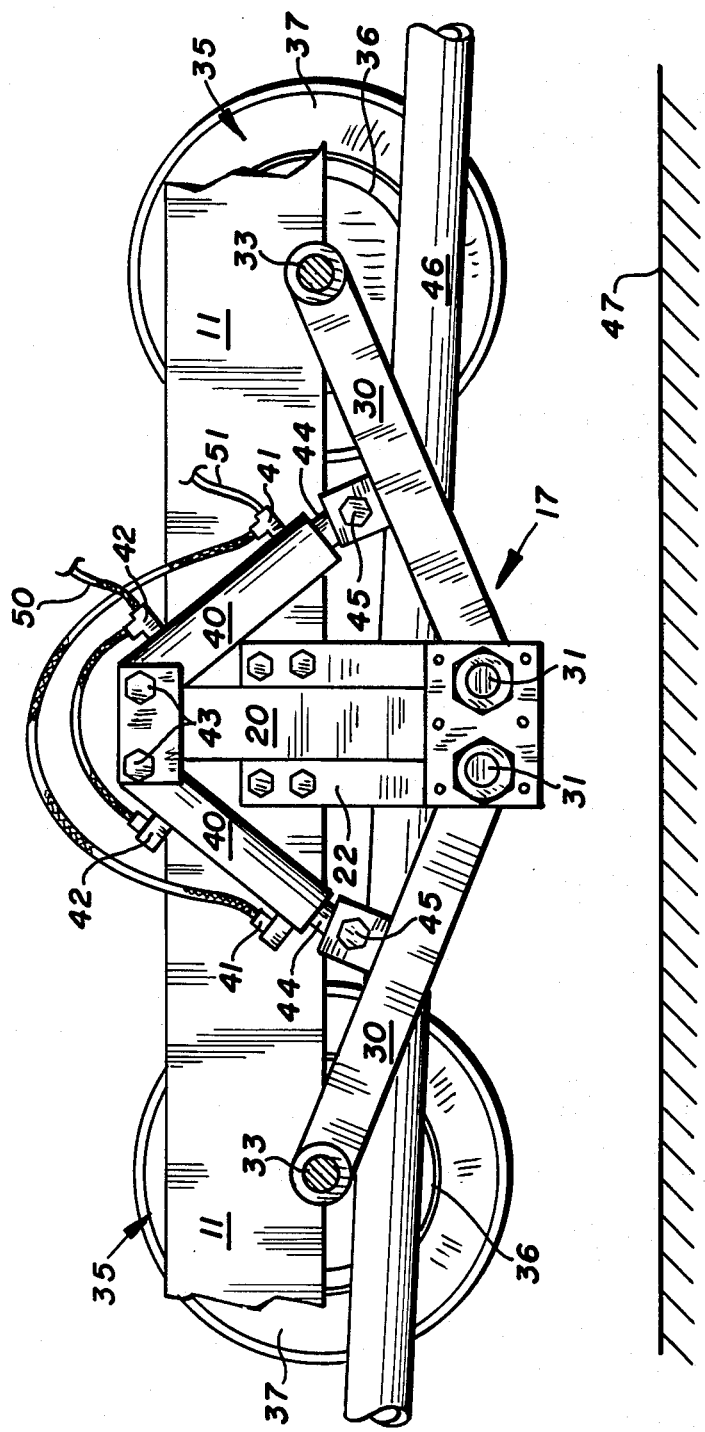
FIG. 5 is a view like FIG. 4 showing the invention in the clearance position.

FIGS. 4 and 5 show that system 17 may include a second, rearwardly extending suspension arm, wheel assembly, and hydraulic actuator mounted on bracket 22, if this is desired, the fluid connections being supplied by conduits 50 and 51 from a suitable hydraulic control system. It is also understood that a like structure may be mounted on a like bracket on the opposite side of the vehicle, as suggested at 17' in FIG. 3, to give balanced contact of the vehicle with the highway, and that the actuation of the second structure may also be energized with fluid from conduits 50 and 51.

Inspection of FIG. 5 will make it clear that stub axles 33 have been raised so that their axes have passed through drive shaft 46 and into the lower portion of frame 11: this would, of course, have been impossible in the conventional structure where full axles extend transversely of the entire vehicle, and makes possible the retraction of wheel members 35 to a point giving clearance over most of the obstacles encountered in transportation activities of the type here contemplated.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. A work vehicle for transporting loads of a weight which can exceed road axle weight restrictions, said vehicle having:
    (a) a generally horizontal frame normally supported above the ground by a plurality of primary axles extending transversely to said frame;
    (b) wheel means rotatably attached to each end of said primary axles;
    (c) at least one auxiliary wheel assembly comprising:
        (1) a suspension arm;
        (2) a stub axle having an axis and projecting from said arm in a first generally horizontal direction;
        (3) wheel means rotatable on said stub axle;
        (4) a mounting bracket adapted for securement to the outside of said generally horizontal frame;
        (5) means pivoting said suspension arm in said bracket, so that said first direction is outward from said frame, for movement of said arm about a second axis aligned with said axis of said axle;
        (6) and means for causing said movement of said arm between first and second extreme positions to lower and raise said axle through a path lying totally outward of the frame, so that said axle moves between a first position in which said wheel means contacts the ground to increase the number of axles having wheel means contacting the ground to help support the vehicle and thus reduce the axle weight of said vehicle and a second position in which said axle is spaced from the ground by a distance greater than the spacing of said frame above the ground to prevent said axle from engaging obstructions in the path of the vehicle.

2. A work vehicle for transporting loads of a weight which can exceed road axle weight restrictions, said vehicle having:
    (a) a generally horizontal frame normally supported above the ground by a plurality of primary axles extending transversely to said frame;
    (b) wheel means rotatably attached to each end of said primary axles;
    (c) at least one auxiliary wheel assembly comprising:
        (1) a suspension arm;
        (2) means mounting said suspension arm outwardly of said frame for pivotal movement, with respect to said frame, about a first generally horizontal axis;
        (3) a stub axle projecting outwardly from said suspension arm and with no portion of said stub axle underlying said frame, said stub axle having a second axis disposed parallel to said first axis;
        (4) wheel means mounted on said axle outward of said frame;
        (5) and means for causing said movement of said arm through a path lying outward of said frame, between a first position to increase the number of axles having wheel means in contact with the ground to help support the vehicle and thus reduce the axle weight of the vehicle and a second position to maintain said axle above the lower level of said frame so that said axle will not engage obstructions on the ground in the path of said vehicle.

3. A work vehicle for transporting loads of a weight which can exceed road axle weight restrictions, said vehicle having:
    (a) a generally horizontal frame normally supported above the ground by a plurality of primary axles extending transversely to said frame;
    (b) wheel means rotatably attached to each end of said primary axles;
    (c) at least one auxiliary wheel assembly comprising:
        (1) a bracket outwardly secured to said frame;
        (2) a pair of suspension arms pivotally attached at first ends to said bracket, to move about parallel axes through arcs extending forward and rearward from said bracket relative to a side of said frame;
        (3) a stub axle carried by each arm at the second end thereof, the axes of said stub axles being parallel to said parallel axes, and said stub axles extending in first directions only from said arms to lie outwardly from said frame;
        (4) wheel means mounted for rotation on said stub axles;
        (5) and means acting between each of said pair of suspension arms and said bracket to cause pivotal movement of said suspension arms between a first position in which said stub axles are above the lowermost portion of the vehicle frame to prevent said stub axles from engaging obstructions on the ground and a second position in which the wheel means mounted to said stub axles engage the ground to help support the vehicle and thus decrease the axle weight of the vehicle.

4. A work vehicle for transporting loads of a weight which can exceed road axle weight restrictions, said vehicle having:
    (a) a generally horizontal frame normally supported above the ground by a plurality of primary axles extending transversely to said frame;
    (b) wheel means rotatably attached to each end of said primary axles;
    (c) at least one auxiliary wheel assembly comprising:
        (1) further wheel means;

(2) and first and second mounting means carried outwardly on each side of said frame for moving said further wheel means into and out of contact with the ground, said mounting means including a stub axle rotatably receiving said further wheel means, a suspension arm, means for securing said arm at one end thereof to said side of said frame for pivotal movement with respect to said frame about a normally horizontal axis transverse to said frame, means mounting said stub axle on said suspension arm to project horizontally away from said frame in an outward direction, and motive means causing said pivotal movement of said arm to raise said stub axle above the lowermost portion of said frame to prevent said stub axle from engaging obstructions on the ground and lower said stub axle until said wheel means engage the ground to help support said vehicle and thus reduce the axle weight of said vehicle.

* * * * *

REEXAMINATION CERTIFICATE (705th)
United States Patent [19]
Wyatt et al.

[11] B1 4,492,389
[45] Certificate Issued Jun. 9, 1987

[54] HIGH-LIFT HYDRAULIC AXLE

[76] Inventors: Gordon F. Wyatt, Rte. 4, Box 122, Isanti, Minn. 55040; Willis G. Wyatt, 8505 Eldorado St., Blaine, Minn. 55434; Erle L. Wyatt, 14461 Highway 65, Anoka, Minn. 55303

Reexamination Request:
No. 90/001,010, May 19, 1986

Reexamination Certificate for:
Patent No.: 4,492,389
Issued: Jan. 8, 1985
Appl. No.: 341,509
Filed: Jan. 21, 1982

[51] Int. Cl.⁴ .............................................. B60G 11/26
[52] U.S. Cl. .................................. 280/704; 280/43.23
[58] Field of Search ............... 280/81 R, 704, 43.23, 280/43.13; 267/64.21, 64.19; 105/215 C

[56] References Cited

U.S. PATENT DOCUMENTS

| | | | |
|---|---|---|---|
| 2,902,289 | 9/1959 | North | 280/81 |
| 2,943,865 | 7/1960 | Fite | 180/24.02 |
| 2,961,249 | 11/1960 | Petersen et al. | 280/34 |
| 3,096,995 | 7/1963 | Richnow | 280/683 |
| 3,112,100 | 11/1963 | Prichard | 259/161 |
| 3,161,418 | 12/1963 | Brennan et al. | 280/81 |
| 3,178,201 | 4/1965 | Richnow | 280/683 |
| 3,199,890 | 8/1965 | Caldwell | 280/704 |
| 3,201,141 | 8/1965 | Bernstein et al. | 280/683 |
| 3,317,193 | 5/1967 | Buelow et al. | 259/161 |
| 3,340,071 | 6/1967 | Bilas | 280/704 |
| 3,390,895 | 7/1968 | Verdi | 280/704 |
| 3,578,352 | 5/1971 | Heine | 280/43.23 |
| 3,689,102 | 9/1972 | Granning | 280/704 |
| 3,704,896 | 12/1972 | Buelow | 280/704 |
| 3,831,210 | 8/1974 | Ow | 280/43.18 |
| 3,860,256 | 1/1975 | Jackson et al. | 280/81 R |
| 3,874,469 | 4/1975 | Sjovall | 180/12 |
| 3,877,715 | 4/1975 | Thayer et al. | 280/81 A |
| 3,912,293 | 10/1975 | Harbers | 280/81 |
| 4,065,153 | 12/1977 | Pringle | 280/704 |
| 4,082,305 | 4/1978 | Allison et al. | 280/81 |
| 4,084,833 | 4/1978 | Mohrbacker et al. | 280/81 A |
| 4,102,424 | 7/1978 | Heinze | 280/43.23 |
| 4,146,243 | 3/1979 | Sims | 280/81 |
| 4,157,188 | 6/1979 | Sims | 280/81 |
| 4,165,792 | 8/1979 | Hohl et al. | 180/24.02 |
| 4,165,884 | 8/1979 | Allison et al. | 280/43.23 |
| 4,195,856 | 4/1980 | Larson et al. | 280/704 |
| 4,314,709 | 2/1982 | Silbernagel | 280/81 A |
| 4,350,358 | 9/1982 | Ferris | 280/81 |

FOREIGN PATENT DOCUMENTS 1195476  6/1970  United Kingdom ............ 280/43.23

*Primary Examiner*—Ross Weaver
*Attorney, Agent, or Firm*—Orrin M. Haugen; Thomas J. Nikolai; Frederick Niebuhr

[57] ABSTRACT

The combination of a suspension arm, a stub axle having an axis and projecting from the arm in a first direction, means pivotally mounting the arm for movement about a second axis parallel to the axis of the axle, and motor means for causing the movement of the arm between, and maintaining it in, first and second extreme positions.

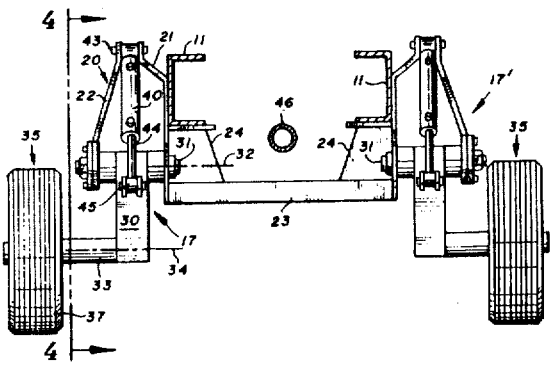

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 3 is confirmed.

Claims 1, 2 and 4 are cancelled.

* * * * *